United States Patent
Deivasigamani et al.

(10) Patent No.: US 11,555,654 B2
(45) Date of Patent: Jan. 17, 2023

(54) HEAT RECOVERY SYSTEM ADAPTABLE TO A SINK

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 46 days.

(21) Appl. No.: 17/223,341

(22) Filed: Apr. 6, 2021

(65) Prior Publication Data

US 2022/0316803 A1 Oct. 6, 2022

(51) Int. Cl.
| | |
|---|---|
| F28D 21/00 | (2006.01) |
| F28D 1/047 | (2006.01) |
| F28D 1/06 | (2006.01) |
| E03C 1/00 | (2006.01) |

(52) U.S. Cl.
CPC .............. *F28D 1/0473* (2013.01); *E03C 1/00* (2013.01); *F28D 1/06* (2013.01); *F28D 21/0012* (2013.01); *E03C 2001/005* (2013.01)

(58) Field of Classification Search
CPC .............. F28D 21/0012; Y02B 30/18; E03C 2001/005; F24D 17/0005; F24D 17/001
See application file for complete search history.

(56) References Cited

U.S. PATENT DOCUMENTS

| | | | | | |
|---|---|---|---|---|---|
| 2,575,325 | A | * | 11/1951 | Ambrose | F25B 5/02 62/181 |
| 4,398,308 | A | * | 8/1983 | Berg | A47K 3/28 4/596 |
| 5,857,515 | A | * | 1/1999 | Skupien | F28D 7/0008 165/47 |
| 2011/0240269 | A1 | * | 10/2011 | Mackenzie | F28F 9/26 165/141 |
| 2014/0237714 | A1 | * | 8/2014 | Rusch | F28F 1/00 156/278 |

FOREIGN PATENT DOCUMENTS

| | | | | |
|---|---|---|---|---|
| DE | 4406971 A1 | * | 10/1994 | A47K 3/00 |
| NL | 1034625 C1 | * | 5/2009 | |

* cited by examiner

*Primary Examiner* — Eric S Ruppert
(74) *Attorney, Agent, or Firm* — Tracy Jong Law Firm; Tracy P. Jong; Cheng Ning Jong

(57) ABSTRACT

A thermal recovery device for recovering waste heat from a sink having a bottom plate, the bottom plate having a top surface and a bottom surface, wherein the bottom plate being a thermal conductor, the thermal recovery device including: a tube including an inlet and an outlet, the tube thermally connected to the bottom surface, wherein thermal communication exists between the top surface and a fluid in the tube, a demand for the fluid causes the fluid to flow through the tube and heat transfer to the fluid which raises the temperature of the fluid prior to entering a heater and subsequently arriving at the top surface of the bottom plate of the sink from which the heat is transferred, reducing the heating load of the heater due to the demand of the fluid.

9 Claims, 4 Drawing Sheets

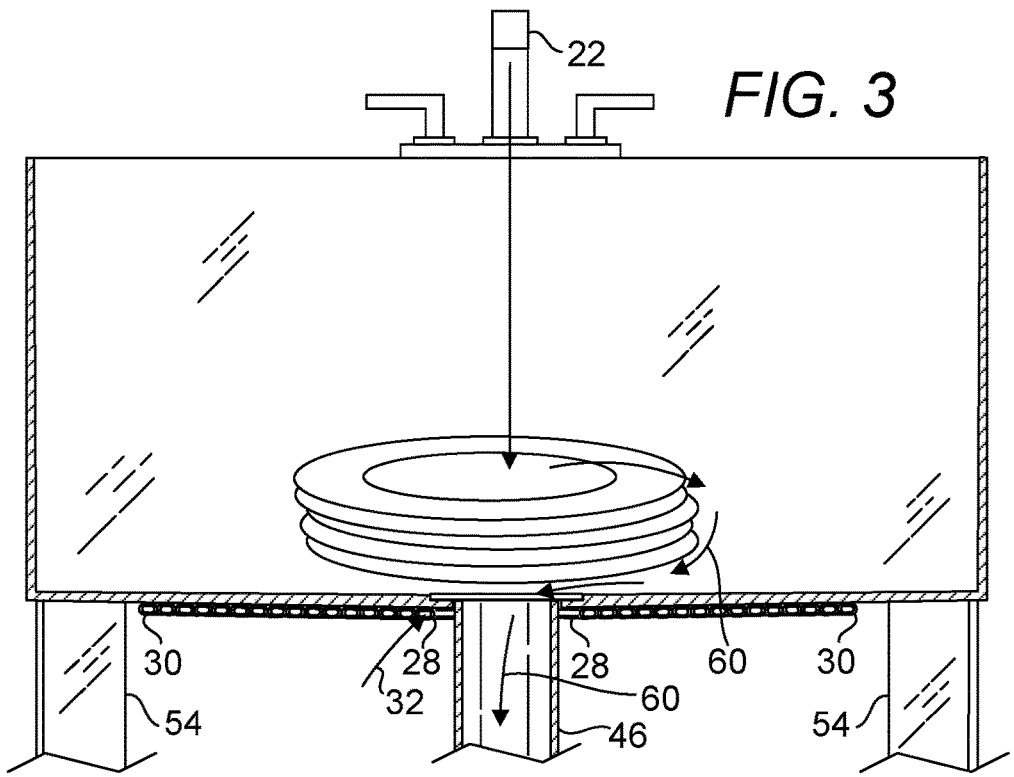
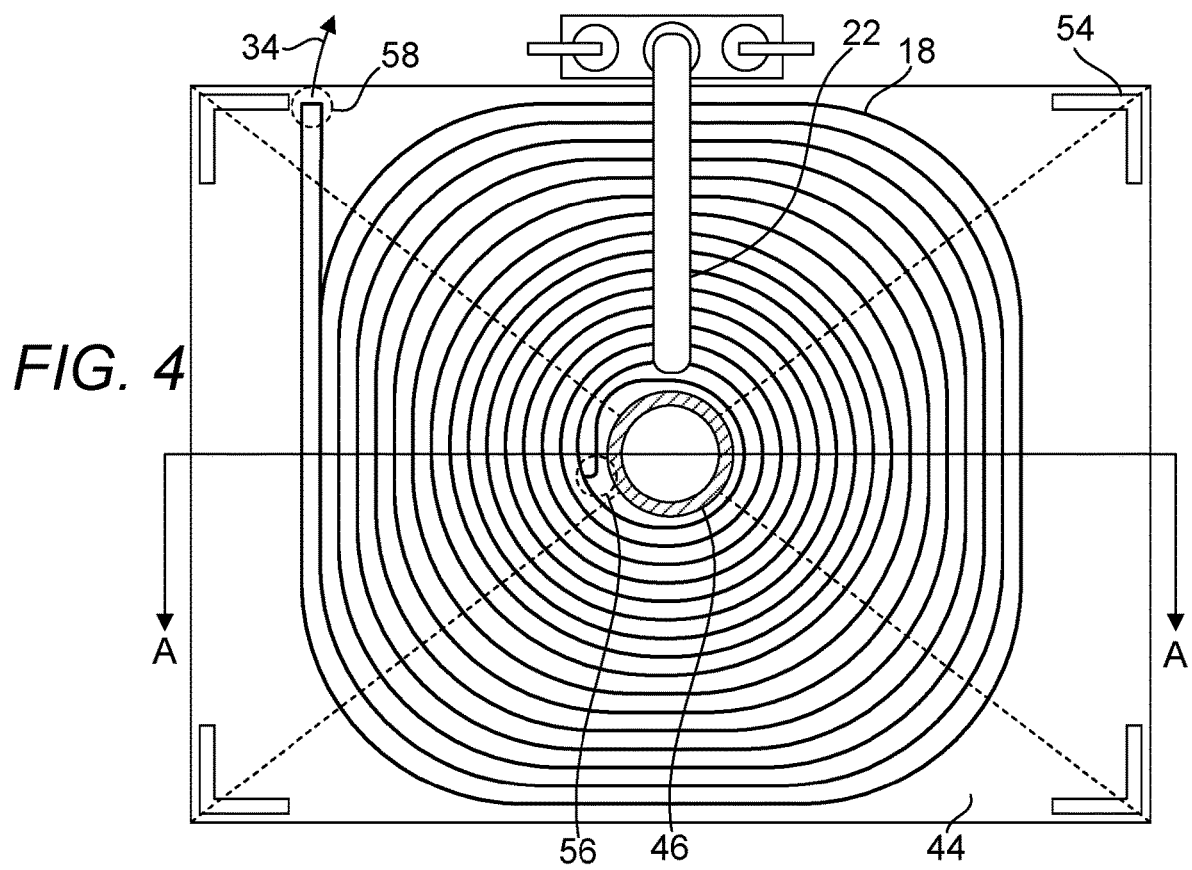

HEAT RECOVERY SYSTEM ADAPTABLE TO A SINK

BACKGROUND OF THE INVENTION

1. The Field of the Invention

The present invention relates to a heat recovery system. More specifically, the present invention is directed to a device capable of being adapted to recover heat from wastewater that is a byproduct of a use of a sink.

2. Background Art

The use of hot water with sinks constitutes a hot water usage mode via which a tremendous amount of thermal energy is lost to the environment, let alone the wastage of water in the form of wastewater and energy wasted to process the wastewater at a treatment plant. When wastewater reaches the top surface of a sink but before following a drainage pipe to be disposed of, it typically retains a tremendous amount of thermal energy before the wastewater continues along its path out of a drainage system, e.g., at the trap under a sink. While recovering thermal energy at the trap under a sink is important, the heat lost, e.g., by convection and conduction to the sink and the interior sink space can be significant and cannot be recovered using the under-the-sink recovery method alone.

There exists a need for a thermal recovery system useful for recovering thermal energy as soon as a supply of hot water has become wastewater.

SUMMARY OF THE INVENTION

In accordance with the present invention, there is provided a thermal recovery device for recovering waste heat from a sink having a bottom plate, the bottom plate having a top surface and a bottom surface, wherein the bottom plate being a thermal conductor, the thermal recovery device including:
  (a) a tube including an inlet and an outlet, the tube thermally connected to the bottom surface, wherein thermal communication exists between the top surface and a fluid in the tube;
  (b) a compressor including an inlet and an outlet, wherein the inlet of the compressor is connected to the outlet of the tube;
  (c) an expansion valve including an inlet and an outlet, wherein the outlet of the expansion valve is connected to the inlet of the tube; and
  (d) a control device functionally coupled to a demand-indicating device for the sink, wherein upon receiving an indication that a demand exists for the sink from the demand-indicating device, the fluid in the tube is mobilized through the expansion valve to cause heat transfer to the fluid in the tube and the same fluid in the tube is mobilized through the compressor to cause heat transfer from the fluid in the tube in a heat exchanger connected at a downstream location of the compressor.

In one embodiment, the tube is a tube configured in a spiral format disposed in a plane, the spiral format including an opening for receiving a drainpipe through the bottom plate. In one embodiment, the thermal recovery device further includes a thermal paste disposed between the tube and the bottom plate of the sink to enhance heat transfer between the bottom plate of the sink and the fluid in the tube.

In one embodiment, the tube is constructed from steel, copper, aluminum or any combinations thereof.

In accordance with the present invention, there is further provided a method for detecting the presence of a substance on a member in thermal contact with a fluid conductor in which a fluid is disposed, the fluid is disposed at a pressure determined by a pressure sensor at a location at the fluid conductor, the method including:
  (a) obtaining a first pressure with the pressure sensor at a first time;
  (b) obtaining a second pressure with the pressure sensor at a second time, wherein the second time is later than the first time; and
  (c) comparing the first pressure to the second pressure, wherein if the second pressure is greater than the first pressure by at least a first threshold, the presence is determined, at a first confidence level, to exist.

In one embodiment, the substance is disposed at a first temperature, the fluid is disposed at a second temperature, the method further includes ensuring the second temperature is lower than the first temperature prior to executing steps (a), (b) and (c). In one embodiment, the member is a bottom plate of a sink. In one embodiment, the first threshold is about 1.1 times of the highest operating pressure obtained by the pressure sensor at the location. In one embodiment, the method further includes obtaining a third pressure at a third time, obtaining a first pressure rise rate based on the first pressure, the second pressure, the first time and the second time, obtaining a second pressure rise rate based on the second pressure, the third pressure, the second time and the third time and comparing the first pressure rise rate and the second pressure rise rate, wherein the third time is later than the second time and if the second pressure rise rate is larger than the first pressure rise rate by a second threshold, the presence is determined, at a second confidence level, to exist and the second confidence level is higher than the first confidence level. In one embodiment, the fluid is a refrigerant. In one embodiment, the fluid conductor is constructed from steel, copper, aluminum or any combinations thereof.

In accordance with the present invention, there is further provided a thermal recovery device for recovering waste heat from a sink having a bottom plate, the bottom plate having a top surface and a bottom surface, wherein the bottom plate being a thermal conductor, the thermal recovery device including: a tube including an inlet and an outlet, the tube thermally connected to the bottom surface, wherein thermal communication exists between the top surface and a fluid in the tube, a demand for the fluid causes the fluid to flow through the tube and heat transfer to the fluid which raises the temperature of the fluid prior to entering a heater and subsequently arriving at the top surface of the bottom plate of the sink from which the heat is transferred, reducing the heating load of the heater due to the demand of the fluid.

In accordance with the present invention, there is further provided a method for detecting the presence of a substance on a member in thermal contact with a fluid conductor in which a fluid is disposed, the method including:
  (a) disposing a temperature sensor in thermal contact with the member to sense a temperature of the member;
  (b) obtaining a first temperature with the temperature sensor at a first time;
  (c) obtaining a second temperature with the temperature sensor at a second time, wherein the second time is later than the first time; and
  (d) comparing the first temperature to the second temperature, wherein if the second temperature is greater than the first temperature by at least a first threshold, the presence is determined, at a confidence level, to exist.

In one embodiment, the method further includes:
(a) obtaining a temperature of the fluid; and
(b) comparing the second temperature and the temperature of the fluid, wherein the step (d) is executed if the second temperature is higher than the temperature of the fluid.

In one embodiment, the threshold is at least about two degrees F. In one embodiment, the method further includes obtaining a third temperature at a third time, obtaining a first temperature rise rate based on the first temperature, the second temperature, the first time at which the first temperature was obtained and the second time at which the second temperature was obtained. This is followed by obtaining a second temperature rise rate based on the second temperature, the third temperature, the second time and the third time. The third time is later than the second time. The first temperature rise rate and the second temperature rise rate are then compared and if the second temperature rise rate is larger than the first temperature rise rate by a second threshold, the presence of a suitable condition for heat recovery is determined, at a second confidence level, to exist and the second confidence level is higher than the first confidence level.

An object of the present invention is to provide an uncomplicated means for retrieving thermal energy that would otherwise be wasted from the drainage of a sink.

Another object of the present invention is to provide a device which can be adapted to an existing sink to recover heat from wastewater.

Another object of the present invention is to provide a method for conserving energy in retrieving or recovering heat from wastewater.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a front cross-sectional view of a sink, depicting a heat recovery mechanism configured to recover heat from wastewater generated at a sink.

FIG. 4 is a top partially transparent view of a sink, depicting a heat recovery mechanism configured to recover heat from wastewater generated at a sink.

PARTS LIST

2—heat recovery system
4—heating system
6—sink
8—compressor
10—expansion valve
12—heat exchanger
14—cold water supply
16—hot water supply
18—heat exchanger or tube
20—pump
22—faucet
24—check valve
26—check valve
28—innermost coil loop
30—outermost coil loop
32—inlet flow
34—outlet flow
36—control device
38—sensing package
40—valve
42—thermal paste
44—bottom plate
46—drainage pipe
48—top surface of bottom plate
50—bottom surface of bottom plate
52—fluid
54—leg or support structure of sink
56—inlet of heat exchanger
58—outlet of heat exchanger
60—wastewater
62—temperature sensor
64—substance, e.g., water, wastewater, etc.
66—curved portion
68—direction
70—heating element, e.g., burner Particular Advantages of the Invention The present heat recovery system requires no energy-intensive standby routines for detecting the needs to run heat recovery routines. Further heat recovery routines are only run when they are required to recover energy that would otherwise be wasted. The energy expended in an effort to recover energy that would otherwise be wasted constitutes a small fraction of the energy recovered.

In one embodiment, the present heat recovery system utilizes a heat pump to recover energy that would otherwise be wasted and as such is capable of extracting a large amount of energy per unit time. This is important as the heat recovery system adapted to the bottom of a sink may be exposed to a hot water flow for short periods of time, making the dwell time for heat transfer smaller than necessary to fully transfer heat before the water flow exits the sink via its drain.

A present heat recovery system does not require modifications to be made to a hot water system in order to implement a demand-indicating device as the present demand-indicating device is part of the present heat recovery system both functionally and physically.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
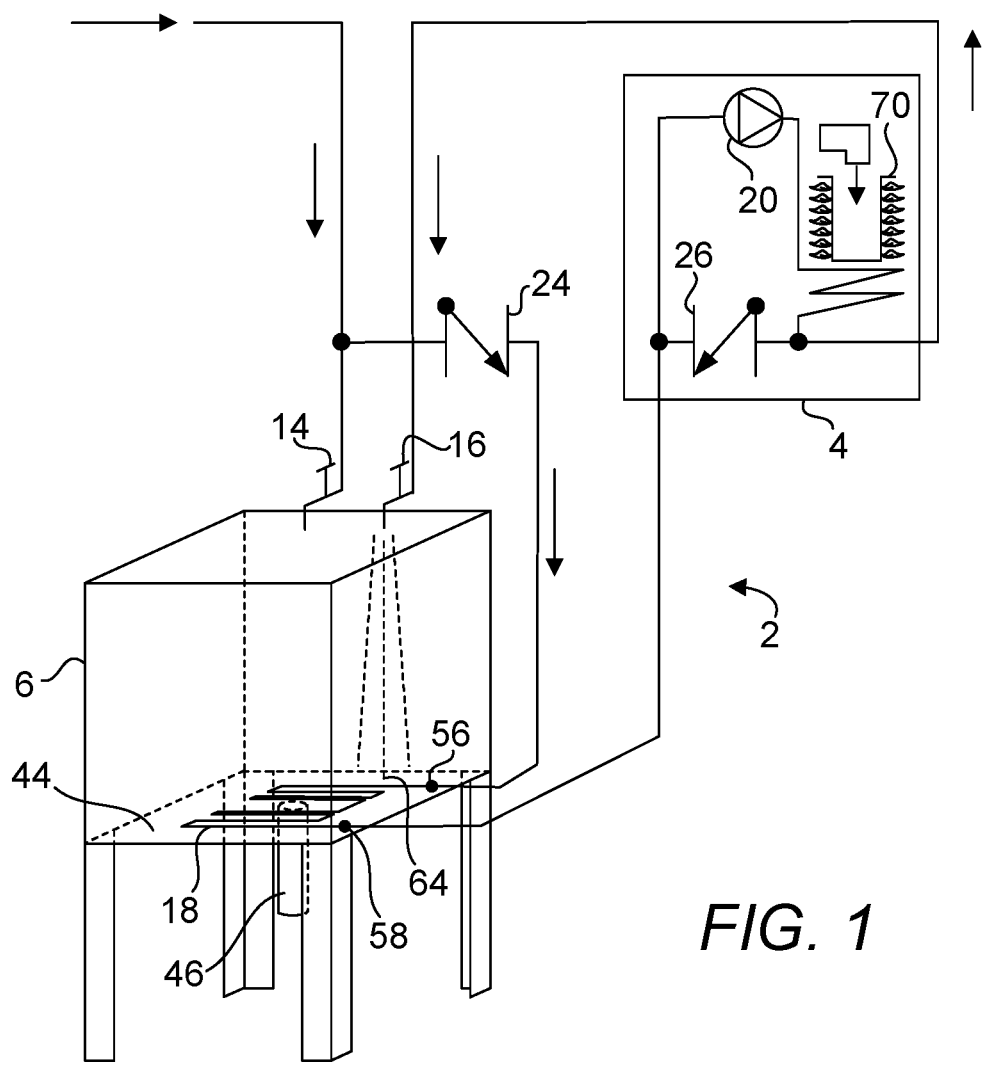
FIG. 1 is a diagram depicting a present heat recovery system adapted to a sink.

FIG. 1 is a diagram depicting a present heat recovery system 2 adapted to a sink 6. The thermal recovery device 2 is useful for recovering waste heat from a sink 2. In a typical water usage at a sink, especially a sink of a food preparation establishment, a large amount of hot water disposed, e.g., at about 85 to 95 degrees F., is used for washing dishes, dislodging food wastes from dishes, silverware, etc. A large proportion of the total thermal energy of the hot water used is left untapped and simply drained onto a bottom plate 44 of the sink 6 before exiting the sink through a drainage pipe 46. There exists a need to capture the otherwise untapped heat energy as soon as the hot water supply becomes wastewater or as close to the point when the hot water supply first becomes wastewater, with as much dwell time as possible to allow for maximum heat extraction from the wastewater for as long as possible. The sink includes a bottom plate 44 surrounded by walls. The bottom plate 44 includes a top surface 48 and a bottom surface 50 with the top surface 48 being the floor of the sink 6. The bottom plate 44 is preferably an excellent thermal conductor, e.g., a steel, copper and aluminum, etc., as long as the heat transfer, e.g., by conduction, between the substance 64, e.g., wastewater disposed on the top surface and the bottom surface can occur readily. A heat exchanger or tube 18 is disposed in thermal contact with the bottom surface 50 of the bottom plate 44 to result in thermal communication between the top surface and a fluid 52 or fluid flow in the tube 18. The tube 18 includes an inlet connected to an inlet to a cold water supply and an outlet to the inlet of a heating system 4. The outlet of the heating system 4 is connected to a hot water supply 16 of a sink 6. A demand for hot water through hot water supply 16 causes an unheated or cold water supply to be drawn into the tube 18 before exiting in the heating system 4. As heat transfer rate is proportional to the temperature difference between the fluid of the tube 18 and the wastewater temperature, an incoming water flow in the tube 18 that has not been artificially heated is capable of drawing the maximum amount of heat from the wastewater falling on the top surface of the sink 6. Upon arriving at the heating system 4, the fluid of the tube 18 which has now acquired some thermal energy from the wastewater is required to be heated to the setpoint temperature of the heating system. As the difference between the setpoint temperature, e.g., 120 degrees F., and the temperature of the fluid entering the heating system is now smaller, the heating load required to get the fluid to the setpoint temperature is lower, thereby making the fluid flow more able to meet a heating demand and/or able to meet a heating demand faster. As shown herein, the heating system 4 is equipped with an internal recirculation circuit and the flow through the tube and heat transfer to the fluid which raises the temperature of the fluid prior to entering a heater and subsequently arriving at the top surface of the bottom plate of the sink from which the heat is transferred, reducing the heating load of the heater due to the demand of the fluid. Therefore, the heating load of heating system can be said to be supplemented with the heat recovered from the usage of the hot water provided. In this embodiment, a hot water demand directly causes heat recovery to occur to the demanded hot water itself. Check valve 26 prevents the fluid flow entering the heating system 4 from bypassing the heater or burner. Check valve 24 prevents an unheated flow or cold water demand at the cold water supply 14 from drawing its supply through the heat recovery system 2. Pump 20 is useful for increasing the water pressure of the demand at the hot water supply and to cause an internal recirculation of the heating system 4 when the hot water is required to be delivered more quickly at the hot water supply 16. The thermal recovery device need not be turned on during the periods when no hot water is demanded.

Figure 2:
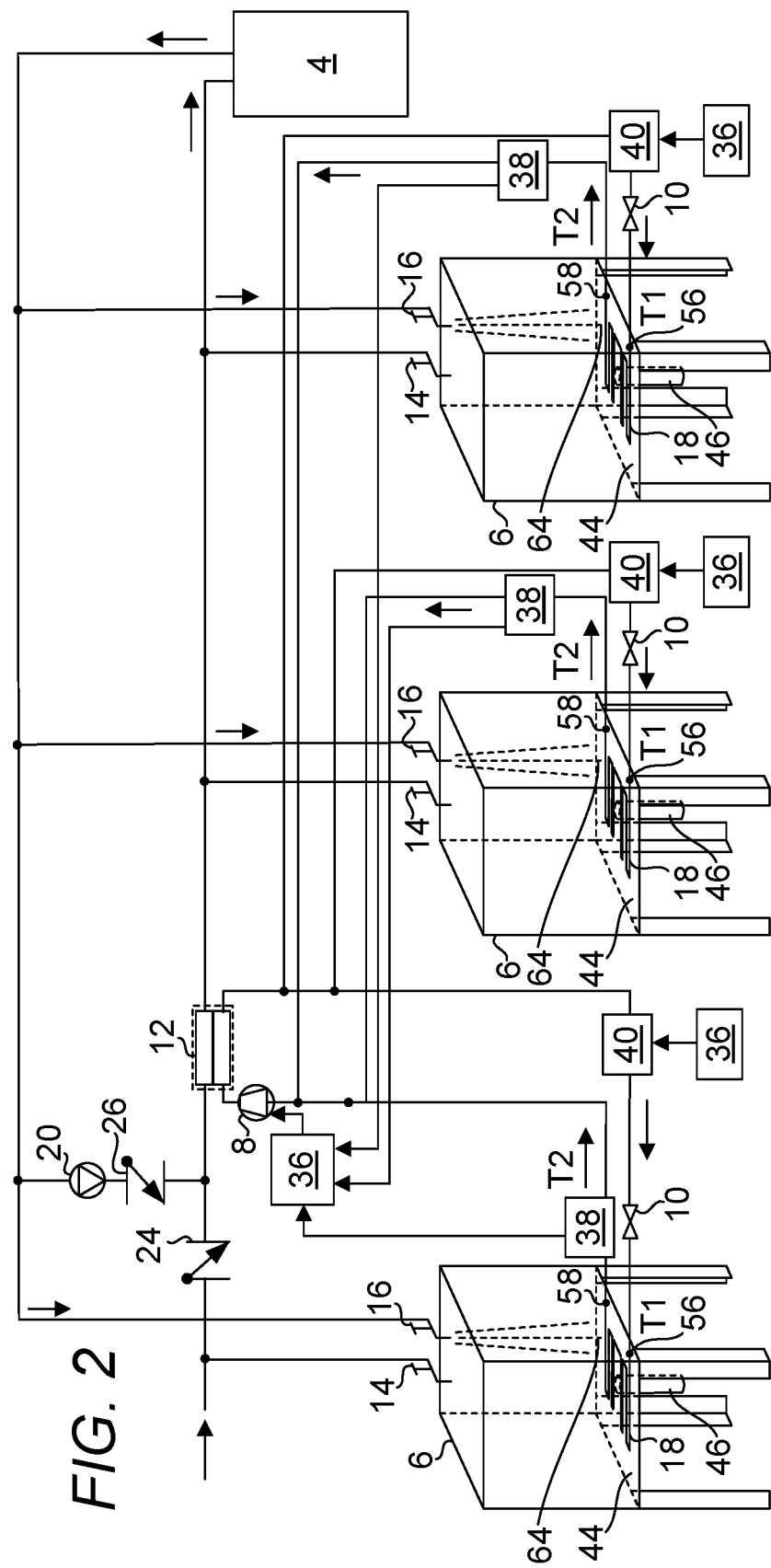
FIG. 2 is a diagram depicting a present heat recovery system adapted to a plurality of sinks.

FIG. 2 is a diagram depicting a present heat recovery system 2 adapted to a plurality of sinks 6. Here, a heat pump is used to recover thermal energy from the wastewater. Three heat recovery systems are shown although the same concept can be applied to any number of heat recovery systems connected in a hot water system. Here, each thermal recovery device includes a tube 18 and an expansion valve 10. All three heat recovery devices share a compressor 8 although each heat recovery device can be coupled to its own compressor. Again, each tube 18 includes an inlet and an outlet, the inlet being connected to the downstream side of an expansion valve 10 and the outlet being connected to the upstream side of the compressor 8. The compressor 8 includes an inlet and an outlet, wherein the inlet of the compressor is connected to the outlet of each tube 18. It shall be noted that a heat pump recovers heat from a sink and passes recovered heat to the heating system 4 via a heat exchanger 12, e.g., a plate-type heat exchanger. The expansion valve 10 includes an inlet and an outlet, wherein the outlet of the expansion valve 10 is connected to the inlet of the tube 18. There is further provided a control device 36 functionally coupled to a demand-indicating device for the sink 2. The control device 36 is shown as separate devices for ease of depiction in FIG. 2. However, there can be only one control device or the control device can be a control device or controller of the heating system 4. The same control device 36 may be used for controlling all output devices, e.g., compressor/s 8, etc. As the heat pumps are not directly responsible for providing hot water, a demand at any one of the hot water supply 16 line would not cause a direct change in the flow of the heat pump. A present heat recovery device relies on a demand-indicating device, e.g., a pressure sensor and/or a temperature sensor disposed in a sensing package 38 to indicate that a heat recovery opportunity is present. When a hot water demand is determined to exist, the heat pump is turned on to start recovering heat from the sink. The shared compressor 8 is turned on to mobilize a fluid, e.g., a refrigerant, through the heat exchanger 12, valve 40, expansion valve 10, heat exchanger 18 and sensing package 38. Upon passing the compressor 8, heat energy stored in the working fluid or refrigerant of the heat recovery system is transferred to the conductor which sends water to be heated in the heating system 4. Again, as the heating load due to the hot water demand is supplemented using the recovered heat transferred to the cold water flow, the heating load at the heat system 4 can be reduced. Upon passing the expansion valve 10, the refrigerant expands, making it suitable to absorb heat from the sink as it passes heat exchanger 18. This cycle continues until the hot water demand no longer exists. In one embodiment, it is also possible to delay the cessation of the compressor 8 to ensure that more residual heat is transferred to the refrigerant and subsequently the water contained in the inlet of the heating system 4 via heat exchanger 12 connected at a downstream location of the compressor 8. Again, check valve 24 prevents an unheated flow or cold water demand at the cold water supply 14 from drawing its supply through the heat recovery system. Pump 20 is useful for causing an internal recirculation of the heating system 4 when the hot water is required to be delivered more quickly at the hot water supply 16. As a flow can be generated by pump 20 in the internal recirculation conductor of the heating system when no hot water demand exists, the water contained therein can be pre-heated by the heating system 4. When a delay to turn off the heat recovery device is used, the same delay shall preferably be applied to pump 20 to pair the actions of compressor 8 and pump 20 to ensure the maximum heat transfer rate from the heat recovery device to the internal recirculation circuit of the heating system 4. Check valve 26 is provided to prevent backflow of cold water through the heating system 4. Instead, a cold water demand at any one of the cold water supply 14 lines is met by the cold water going through check valve 24 directly to a cold water supply 14 line desired. When a heat recovery device is not needed for heat recovery, valve 40 for the particular device is closed to prevent inadvertent flow through it.

In one embodiment, a method is provided for detecting the presence of a condition for starting the heat recovery device. For a sink, this condition may be met when hot water is demanded and when the hot water which turns into wastewater on the top surface of the bottom plate 42 is disposed at a temperature higher than the refrigerant temperature of a heat recovery device. In one embodiment, the increase of refrigerant pressure as detected by the pressure sensor in the sensing package 38 is used as a trigger to start the heat pump by turning on the compressor 8. The pressure sensor is preferably disposed within heat exchanger 18 or at the outlet of heat exchanger 18 to ensure that any increase in pressure can be swiftly detected. A pressure increase can be determined by first obtaining a first pressure with the pressure sensor at a first time.

Then a second pressure is obtained at a second time where the second time is later than the first time. The first pressure is then compared to the second pressure and if the second pressure is greater than the first pressure by at least a first threshold, the presence of a condition for heat recovery is determined, at a first confidence level, to exist. A pressure can mean a single pressure that is obtained at a particular time or it can mean an average pressure obtained over a time period. In either case, the goal is to determine whether heat recovery is desired in order to avoid wasting energy in the heat pump operation. To avoid an unnecessary or undesirable operation of the heat pump, the first confidence level may not be sufficient as the hot water demand for a particular application may be more sporadic and it is not always desirable to turn on simply because an increase of pressure has been detected. In one embodiment, the method further includes ensuring the refrigerant temperature is lower than the wastewater temperature prior to the pressure rise analysis disclosed elsewhere herein to avoid heat flow from the refrigerant disposed at a higher temperature to the sink disposed at a lower temperature. Such a measure is also necessary in cases where cold water is often requested between hot water requests. One way to provide the wastewater temperature is by inferring the temperature based on a temperature sensor reading obtained at the faucet, e.g., via a temperature sensor configured to sense the temperature of a water supply at the faucet. In one embodiment, the first threshold is about 1.1 times of the highest operating pressure obtained by the pressure sensor at the location. A calibration routine may be required on-site to establish the highest operating pressure of the heat recovery system prior to the use of the heat recovery system. If a calibration routine is not possible on-site, a factory or pre-determined value will be used instead.

In one embodiment, the method further includes obtaining a third pressure at a third time, obtaining a first pressure rise rate based on the first pressure, the second pressure, the first time at which the first pressure was obtained and the second time at which the second pressure was obtained. The first pressure rise rate can be obtained by dividing the difference between the second pressure and the first pressure by the difference between the second time and the first time, i.e., (second pressure—first pressure)/(second time—first time). This is followed by obtaining a second pressure rise rate based on the second pressure, the third pressure, the second time and the third time. The third time is later than the second time. The second pressure rise rate can be obtained by dividing the difference between the third pressure and the second pressure by the difference between the third time and the second time, i.e., (third pressure—second pressure)/(third time—second time). The first pressure rise rate and the second pressure rise rate are then compared and if the second pressure rise rate is larger than the first pressure rise rate by a second threshold, the presence of a suitable condition for heat recovery is determined, at a second confidence level, to exist and the second confidence level is higher than the first confidence level.

Figure 5:
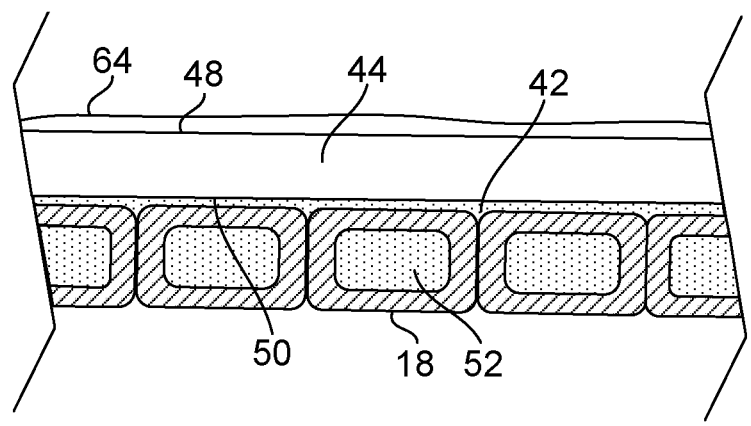
FIG. 5 is a close-up cross-sectional view of a portion of the bottom plate of a sink and heat exchanger thermally coupled to the bottom plate of the sink, as taken along line A-A of FIG. 4.

FIG. 3 is a front cross-sectional view of a sink, depicting a heat recovery mechanism configured to recover heat from wastewater generated at a sink. FIG. 4 is a top partially transparent view of a sink, depicting a heat recovery mechanism configured to recover heat from wastewater generated at a sink. FIG. 5 is a close-up cross-sectional view of a portion of the bottom plate 44 of a sink and heat exchanger 18 thermally coupled to the bottom plate 44 of the sink, as taken along line A-A of FIG. 4. Referring to FIGS. 3 and 4, both the cold water supply and hot water supply are represented by a faucet 22. In one embodiment, the tube 18 is a tube configured in a spiral format disposed in a plane that is rather flat, i.e., the tube is substantially disposed in a plane or one which is capable of conforming to the contour of the bottom plate 44 that encourages drainage of wastewater into the drainage pipe 46, e.g., by pressing the tube in the spiral format against the bottom surface of the bottom plate. The spiral format includes an opening for receiving a drainpipe 46 through the bottom plate 44. Note the tube 18 that is formed by coiling the tube 18 in substantially a plane to result in a tube with an innermost coil loop 28 adjacent this opening. An inlet 56 is disposed at the innermost coil loop 28 such that the inlet refrigerant flow 32 generally flows in a direction away from the opening towards the outermost coil loop 30 to be an outlet flow 34 an outlet 58. A thermal paste 42 is disposed between the tube 18 and the bottom plate 44 of the sink to enhance heat transfer between the bottom plate 44 of the sink and the fluid 52 in the tube 18. The inlet 56 is preferably disposed at the center of the spiral as the temperature difference between the refrigerant of the tube and the wastewater in the sink at this point is the largest and the drainage pipe 46 represents the last point where heat can be recovered as compared to the area surrounding the drainage pipe 46. The tube 18 is preferably constructed from a flat tubing to ensure a large contact area of the tube 18 with the bottom plate 44 when the tube 18 is laid flat with its broad side facing the bottom surface. By disposing the heat exchanger 18 on the bottom surface of the bottom plate, the heat exchanger 18 is out of sight of a user of the sink and the top surface of the bottom plate is unaltered. An insulating cover may be disposed at the bottom of the tube 18 to both reduce heat loss through the tube 18 and to secure the tube 18 in place. In one embodiment not shown, the heat exchanger 18 is integrally formed as the bottom plate of a sink such that an external thermal recovery device is not required to be coupled to the sink.

Figure 6:
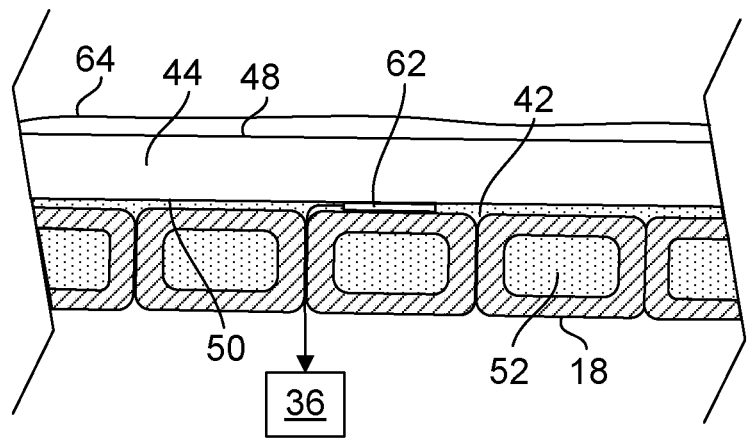
FIG. 6 is a close-up cross-sectional view of a portion of the bottom plate of a sink and heat exchanger thermally coupled to the bottom plate of the sink, as taken along line A-A of FIG. 4, depicting another means for detecting a need for turning on a present heat recovery system.

FIG. 6 is a close-up cross-sectional view of a portion of the bottom plate of a sink and heat exchanger 18 thermally coupled to the bottom plate 44 of the sink, as taken along line A-A of FIG. 4, depicting another means for detecting a need for turning on a present heat recovery system. The method disclosed elsewhere herein which relies on a pressure change of a fluid in a heat exchanger 18 as a hot water demand indicator is particularly suitable for a fluid that is compressible or a gas. However, for a heat exchanger 18 in which a liquid in used or where an increased level of confidence that a hot water demand exists is desired, there is further or alternatively provided a method for detecting the presence of a hot water demand at a sink without requiring direct sensing of a demand at a hot water delivery point, e.g. a faucet. A temperature sensor 62 is disposed in thermal contact with the bottom plate 44 of a sink 6 to sense a temperature of bottom plate 44. In the embodiment shown, temperature sensor 62 is disposed between the bottom plate 44 and heat exchanger 18. In one embodiment, the temperature sensor 62 is embedded or integrally incorporated just under the top surface of the bottom plate 44 to hasten the detection of a temperature change or increase at the temperature sensor 62 by reducing the effective heat transfer distance to the temperature sensor 62 from the hot water that comes in contact with a top surface of the bottom plate 44. A temperature increase can be determined by first obtaining a first temperature with the temperature sensor 62 at a first time. Then a second temperature is obtained at a second time where the second time is later than the first time. The first temperature is then compared to the second temperature and if the second temperature is greater than the first temperature by at least a threshold, e.g., at least about two degrees F., the presence of a condition for heat recovery is determined, at a confidence level, to exist. A temperature can mean a single temperature that is obtained at a particular time or it can mean an average temperature obtained over a time period. In either case, the goal is to determine whether heat recovery is desired in order to avoid wasting energy in the heat recovery operation. In one embodiment, it is further desired to ensure that heat transfer occurs in the right direction, i.e., from the wastewater to the heat exchanger 18. Therefore, in this embodiment, it is necessary to ensure that the wastewater is disposed at a temperature higher than the temperature of the fluid in the heat exchanger 18 before a temperature rise in the fluid over time is necessary to be ascertained by comparing the second temperature and the first temperature.

In one embodiment, the method further includes obtaining a third temperature at a third time, obtaining a first temperature rise rate based on the first temperature, the second temperature, the first time at which the first temperature was obtained and the second time at which the second temperature was obtained. The first temperature rise rate can be obtained by dividing the difference between the second temperature and the first temperature by the difference between the second time and the first time, i.e., (second temperature−first temperature)/(second time−first time). This is followed by obtaining a second temperature rise rate based on the second temperature, the third temperature, the second time and the third time. The third time is later than the second time. The second temperature rise rate can be obtained by dividing the difference between the third temperature and the second temperature by the difference between the third time and the second time, i.e., (third temperature−second temperature)/(third time−second time). The first temperature rise rate and the second temperature rise rate are then compared and if the second temperature rise rate is larger than the first temperature rise rate by a second threshold, the presence of a suitable condition for heat recovery is determined, at a second confidence level, to exist and the second confidence level is higher than the first confidence level.

Figure 7:
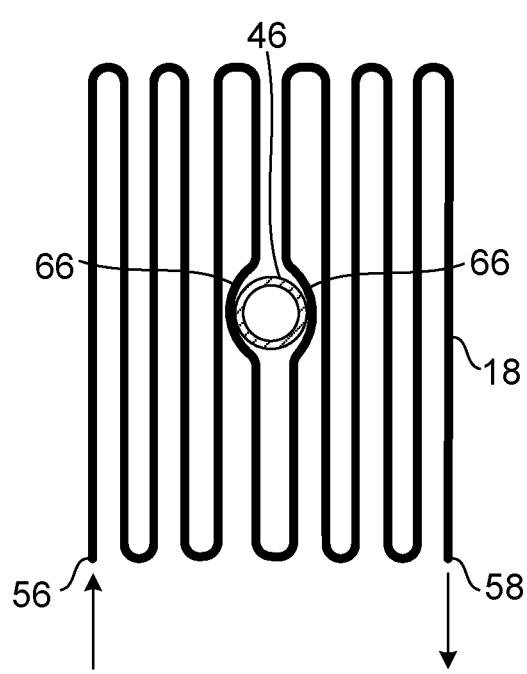
FIG. 7 is a diagram depicting another heat recovery mechanism configured to recover heat from wastewater generated at a sink.
Figure 8:
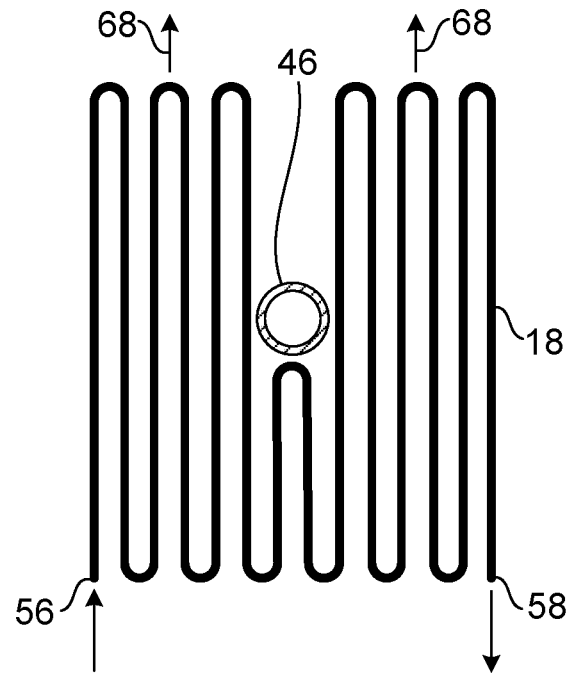
FIG. 8 is a diagram depicting yet another heat recovery mechanism configured to recover heat from wastewater generated at a sink.

FIG. 7 is a diagram depicting another heat recovery mechanism configured to recover heat from wastewater generated at a sink. FIG. 8 is a diagram depicting yet another heat recovery mechanism configured to recover heat from wastewater generated at a sink. Referring to FIG. 7, the heat exchanger 18 includes lines arranged in a generally parallel format. A tube 18 can be disposed in this format by bending a straight tube according to the final shape desired. Curved portions 66 are provided to accommodate a drainage pipe 46. In one embodiment, the tube 18 is sufficiently flexible such that the portions of the tube 18 supporting the curved portions 66 can be temporarily flexed about the center of the tube 18 to enlarge the clearance afforded by the space bounded by the curved portions 66. If ease of installation of a present heat recovery mechanism is desired, the tube 18 shall be configured in a manner to allow a simple seating of the tube 18 around a drainage pipe 46 by displacing the tube 18 relative to the drainage pipe 46 in direction 68. The lines are preferably disposed as close as possible to one another to encompass an effective total heat transfer surface area that is as large as possible.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A thermal recovery device for recovering waste heat from a sink having a bottom plate, the bottom plate having a top surface and a bottom surface, wherein the bottom plate being a thermal conductor, said thermal recovery device comprising:
   (a) a tube comprising an inlet and an outlet, said tube thermally connected to the bottom surface, wherein thermal communication exists between the top surface and a fluid in said tube;
   (b) a compressor comprising an inlet and an outlet, wherein said inlet of said compressor is connected to said outlet of said tube;
   (c) an expansion valve comprising an inlet and an outlet, wherein said outlet of said expansion valve is connected to said inlet of said tube;
   (d) a pressure sensor disposed at a location at said tube; and
   (e) a control device functionally coupled to a demand-indicating device for the sink, said control device configured to detect the presence of a substance on the bottom plate, the fluid in said tube is disposed at a pressure determined by said pressure sensor, said control device is configured to:
      (i) obtain a first pressure with said pressure sensor at a first time;
      (ii) obtain a second pressure with the pressure sensor at a second time, wherein said second time is later than said first time; and
      (iii) compare said first pressure to said second pressure, wherein if said second pressure is greater than said first pressure by at least a first threshold, the presence is determined, at a first confidence level, to exist,
   wherein upon determining that the presence exists, the fluid in said tube is mobilized through said expansion valve to cause heat transfer to the fluid in said tube and the same fluid in said tube is mobilized through said compressor to cause heat transfer from the fluid in said tube in a heat exchanger connected at a downstream location of said compressor.

2. The thermal recovery device of claim 1, wherein said tube is a tube configured in a spiral format disposed in a plane, said spiral format comprising an opening for receiving a drainpipe through the bottom plate.

3. The thermal recovery device of claim 1, further comprising a thermal paste disposed between said tube and the bottom plate of the sink to enhance heat transfer between the bottom plate of the sink and the fluid in said tube.

4. The thermal recovery device of claim 1, wherein the substance is disposed at a first temperature, the fluid is disposed at a second temperature, said control device is further configured to ensure the second temperature is lower than the first temperature prior to executing steps (i), (ii) and (iii).

5. The thermal recovery device of claim 1, wherein said first threshold is about 1.1 times of the highest operating pressure obtained by said pressure sensor.

6. The thermal recovery device of claim 1, wherein said control device is further configured to:
   (a) obtain a third pressure at a third time with said pressure sensor;
   (b) obtaining a first pressure rise rate based on said first pressure, said second pressure, said first time and said second time;
   (c) obtain a second pressure rise rate based on said second pressure, said third pressure, said second time and said third time, and compare said first pressure rise rate and said second pressure rise rate,
   wherein said third time is later than said second time and if said second pressure rise rate is larger than said first pressure rise rate by a second threshold, the presence is determined, at a second confidence level, to exist and said second confidence level is higher than said first confidence level.

7. A sink comprising:
   (a) a bottom plate comprising a top surface and a bottom surface, wherein said bottom plate being a thermal conductor; and
   (b) a thermal recovery device for recovering waste heat from said sink, said thermal recovery device comprising:
      (i) a tube comprising an inlet and an outlet, said tube thermally connected to the bottom surface, wherein thermal communication exists between the top surface and a fluid in said tube;
      (ii) a compressor comprising an inlet and an outlet, wherein said inlet of said compressor is connected to said outlet of said tube;
      (iii) an expansion valve comprising an inlet and an outlet, wherein said outlet of said expansion valve is connected to said inlet of said tube;
      (iv) a pressure senor disposed at a location at said tube; and
      (v) a control device functionally coupled to a demand-indicating device for said sink, said control device configured to detect the presence of a substance on said bottom plate, the fluid is disposed at a pressure determined by said pressure sensor, said control device is configured to:
         obtain a first pressure with said pressure sensor at a first time;
         obtain a second pressure with said pressure sensor at a second time, wherein said second time is later than said first time; and
         compare said first pressure to said second pressure, wherein if said second pressure is greater than said first pressure by at least a first threshold, the presence is determined, at a first confidence level, to exist,
   wherein upon determining that the presence exists, the fluid in said tube is mobilized through said expansion valve to cause heat transfer to the fluid in said tube and the same fluid in said tube is mobilized through said compressor to cause heat transfer from the fluid in said tube in a heat exchanger connected at a downstream location of said compressor.

8. The sink of claim 7, wherein said tube is a tube configured in a spiral format disposed in a plane, said spiral format comprising an opening for receiving a drainpipe through the bottom plate.

9. The sink of claim 7, further comprising a thermal paste disposed between said tube and the bottom plate of said sink to enhance heat transfer between the bottom plate of said sink and the fluid in said tube.

* * * * *